(12) United States Patent
Rafanello

(10) Patent No.: US 6,792,437 B2
(45) Date of Patent: Sep. 14, 2004

(54) STICKY DRIVE LETTERS FOR COMPUTER MEDIA

(75) Inventor: Benedict Michael Rafanello, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 10/189,939

(22) Filed: Jul. 3, 2002

(65) Prior Publication Data

US 2002/0198865 A1 Dec. 26, 2002

Related U.S. Application Data

(62) Division of application No. 09/409,590, filed on Sep. 30, 1999, now Pat. No. 6,578,034.

(51) Int. Cl.[7] .............................................. G06F 17/30
(52) U.S. Cl. ......................................... 707/203; 707/10
(58) Field of Search ................................ 707/203, 205, 707/10; 710/5; 704/4; 341/87

(56) References Cited

U.S. PATENT DOCUMENTS

| | | | | |
|---|---|---|---|---|
| 5,652,897 A | * | 7/1997 | Linebarger et al. | 704/4 |
| 5,691,190 A | * | 11/1997 | Girard et al. | 435/255.1 |
| 5,822,142 A | * | 10/1998 | Hicken | 360/53 |
| 5,854,941 A | * | 12/1998 | Ballard et al. | 710/5 |
| 5,873,097 A | * | 2/1999 | Harris et al. | 707/203 |
| 5,963,392 A | * | 10/1999 | Sri-Jayantha et al. | 360/75 |
| 6,054,943 A | * | 4/2000 | Lawrence | 341/87 |

* cited by examiner

Primary Examiner—Diane D. Mizrahi
(74) Attorney, Agent, or Firm—Robert H. Frantz; David A. Mims, Jr.

(57) ABSTRACT

A database is employed for the recording of assigned computer disk drive letters, but database is distribute across multiple drives and media, rather than centralizing the database as prior art systems have done. Fragments of the database are stored within the unused portion of disk space located after partition tables but before the beginning of a partition, thereby forming one or more Shadow Partition Tables. In these Shadow Partition Tables, the drive letter assignments or logical volume assignments for the particular piece of media and partition are stored. A method for automatically determining relationship between entries in the normal partition tables and the Shadow Partition Tables is employed which is compatible with industry standard disk format definitions, while allowing enhanced drive letter assignment management especially useful for removable disk media.

16 Claims, 5 Drawing Sheets

STICKY DRIVE LETTERS FOR COMPUTER MEDIA

CROSS-REFERENCE TO RELATED APPLICATIONS CLAIMING BENEFIT UNDER 35 U.S.C. 120

This patent application is a divisional application related to U.S. patent application Ser. No. 09/409,590, now U.S. Pat. No. 6,578,034, filed on Sep. 30, 1999, by Benedict Michael Rafanello.

INCORPORATION BY REFERENCE

The related U.S. patent application Ser. No. 09/409,590 now U.S. Pat. No. 6,578,034 is hereby incorporated by reference in its entirety, including drawings and figures.

FEDERALLY SPONSORED RESEARCH AND DEVELOPMENT STATEMENT

This invention was not developed in conjunction with any Federally sponsored contract.

MICROFICHE APPENDIX

Not applicable.

BACKGROUND OF THE INVENTION

1. Field of the Invention

This invention pertains to the arts of persistent and non-volatile computer data storage and the organization of the devices thereof. In particular, this invention relates to the art of assignment of drive letters which travel with the computer data storage media, including removable hard disk drives and removable optical drives.

2. Description of the Related Art

This application is a divisional application of U.S. patent application Ser. No. 09/409,590, now U.S. Pat. No. 6,578,034 filed on Sep. 30, 1999.

Persistent and mass data storage devices for computer systems, especially those employed in personal computers, are well known within the art. Many are disk-based, such as floppy disks, removable hard disk drives ("HDD"), and compact-disk read only memories ("CD-ROM"). FIG. 1 shows a typical personal computer system (1) architecture, wherein a CPU (2) interfaces to a variety of I/O devices such as a keyboard (3), monitor or display (5) and a mouse (4). The CPU (2) also may interface to a number of storage peripherals including CD-ROM drives (7), hard disk drives (6), and floppy drives (5). Typically, floppy disk drives interface to the CPU via Integrated Drive Electronics ("IDE") (8), but this interface may alternately be one of several other standard interfaces or a proprietary interface. The hard disk drives (6) and CD-ROM drives (7) may interface to the CPU (2) via an IDE or Small Computer System Interface ("SCSI"), as shown (9).

FIG. 2 shows a generalization of the hardware, firmware and software organization of a personal computer system (20). The hardware group (21) includes the persistent storage devices discussed supra, as well as other system hardware components such as a real-time clock, keyboard controller, display adapter, etc. A basic input/output system ("BIOS") (22) provides the direct firmware control of these system components typically. An operating system (24) such as the IBM OS/2 operating system provides high level management of the system resources, including the multitasking or multi-threaded scheduling and prioritization of the system application programs (25). This generalized view of the system also applies to systems on alternate, non-IBM-compatible platforms, such as workstations, which employ a variety of operating systems such as Microsoft Windows or UNIX. This general organization of computer system resources and software functionality is well understood in the art.

Turning to FIG. 3, disk-based mass storage devices such as hard disk drives, floppy disks and CD-ROMS are based physically on a rotating storage platter (30). This platter may be made of flexible mylar, such as floppy disks, or more rigid platters made of aluminum, glass or plastic, such as hard disk drives and CD-ROMS. For magnetic media, one or both sides of the platter are coated with a magnetic layer capable of recording magnetic pulses from a read/write head. For optical media, data recording is made using changes in reflectivity of a band of light, which is then read by a laser-based head. Writable and Re-writable CD-ROM drives combine the technologies of magnetic disks and optical disks. In general, though, the organization of data on the disk is similar. The disk surfaces are divided into multiple concentric rings, or tracks (31). Some disk drives, such as hard disk drives, consist of multiple platters, in which case corresponding tracks on each platter are grouped into cylinders. Each track is divided into multiple sectors (32) in which data can be stored.

In order to simplify the formatting and control of disk platters, most DOS-based disk formats use a uniform sector length of 512 bytes within all tracks, with additional header and trailer information in each sector bringing a sector to a total standard length of 571 bytes. FIG. 4 shows a typical sector breakdown on a track (31), including header area (40), followed by a 512 byte area for data storage (41), and concluded by an area for Error Correction Codes ("ECC") (42). A small gap (43) precedes and follows each sector to provide physical separation between the previous sector (45) and the succeeding sector (44).

As the tracks towards the outer edge of the platter are much longer than the tracks located towards the inner edge or center of the platter, the outer tracks are physically capable of holding more of the equal-length sectors.

Computer disk drives are typically broken into one or more partitions, each of which may be assigned different logical volume or drive letter designations. The partitioning of a physical disk drive is controlled by the partition tables located on it, along with some simple rules which govern where partitions may start and end.

Generally, the rules followed by almost all personal computer operating systems are:

(a) a partition must consist of contiguous disk space, (b) there may only be 4 partitions on a disk maximum, (c) the partition table which defines these 4 partitions is part of the Master Boot Record (MBR), (d) the MBR must always be located in the first sector on the disk, (e) partitions may be of two types, Primary or Extended, (f) only one extended partition may exist on a disk, (g) Primary partitions must always start on cylinder boundaries unless immediately preceded by an MBR, in which case a Primary partition may start on the first track following the MBR, (h) Extended partitions must always start on a cylinder boundary, and (i) Partitions, whether Primary or Extended, must end on a cylinder boundary.

To allow more than 4 partitions on a drive, an extended partition can be divided into logical drives. Each logical drive is set up to look like a disk drive, i.e. it's first sector will contain the equivalent of an MBR (called an EBR) which contains a partition table. This partition table defines one primary partition, which is commonly referred to as a "logical drive," even though it is actually a logical partition. The entire structure consisting of the EBR and the logical partition is the "logical drive". As with all primary partitions following an MBR or EBR, it will start on the first track following the EBR, and end on a cylinder boundary. If there is more than one logical drive existing in the extended partition, then this partition table will also define an extended partition. As with all extended partitions, this extended partition will start and end on a cylinder boundary. This extended partition entry in the EBR is really just a link to the start of the next logical drive. All of the logical drives defined in an extended partition will have this link in their EBRs, except for the last logical drive. The last logical drive in the chain will have only a primary partition defined in its EBR. Thus, the chain of logical drives in an extended partition may be treated as a linked list.

TABLE 1 shows a view of a typical partition table for a disk having two partitions on a 6 Giga Byte drive which has 255 usable sides and 63 sectors per track.

TABLE 1

Partition Table for 6 GB Drive

| Partition | Start (cylinder, side, sector) | End (cylinder, side, sector) | Length (sectors) |
|---|---|---|---|
| first | 0, 1, 1 | 391, 254, 63 | 6297417 |
| second | 392, 0, 1 | 783, 254, 63 | 6297480 |

For the disk partitioning shown in TABLE 1, the MBR is located in the first sector on side 0 at cylinder 0 sector 1. The MBR requires only one sector, but the entire track of 63 sectors is "blocked" for the use of the MBR, 62 sectors of side 0 cylinder 0 are left unused.

The partitioning rules just discussed have some interesting repercussions, including:

(a) there can be at most 4 primary partitions,
(b) a disk can be partitioned such that there can be as many logical drives as disk space permits,
(c) if one or more logical drives exist, then there can be at most 3 primary partitions,
(d) it is possible to partition a disk such that blocks of disk space are unusable (i.e. they can not be defined as being part of a partition), and
(e) as a result of the restrictions on where a partition may start, there will be unused sectors in a track containing an MBR or EBR.

An example of issue (d) above would be to create a disk with two primary partitions, an extended partition, and then another primary partition. If all of the disk space is not contained within one of the 4 defined partitions, then there is no way to create a partition to hold it and the disk space is therefore unusable.

Disk drives and partitions of disks are typically assigned a drive letter, such as "A:" and "B:" for floppy disks, "C:" for a bootable fixed hard disk drive, and "D:", "E:", etc. for additional drives such as hard disk drives, removable drives including HDD, CD-ROM, etc. In most operating systems, the drive letters are assigned to the devices in the order that the machine detects them during system initialization. Some of the interfaces such as IDE and SCSI have hardware identifier selectors which determine which devices will be found first so that the bootable files can be stored on that device, but in general, the rest of the devices are assigned drive letters in a first-found first-assigned manner.

Generally, a computer system maintains on the bootable drive a centralized registry or database of types of drives and their assigned drive letters. One problem arises when the bootable drive is exchanged, such as for upgrade or replacement of the device, or when it is desirable to have the bootable drive based on removable media. In either case, maintaining proper assignment of drive letters may be difficult or burdensome, requiring manual adjustments and settings.

In most operating systems, application software can be installed on any media, including floppy, fixed disk (non-removable disk), or removable media. During installation of the application software, certain choices are made by the technician performing the installation as to placing all or some of the software files, including executables, dynamic-linked libraries (.DLLs), initialization files (.INI), data files (.DAT) and other files, on certain drives and drive media. As some drive media is removable, such as removable hard disk drives in a workstation or file server, these files may be installed on fixed or removable devices. Most application software records the location of these files, which include program and data files, by the drive letter plus directory or folder which the technician selects. For example, when installing a Lotus word processor application program, Lotus WordPro, a technician may select most of the program files to be installed on the "E:" drive in a directory name "\LWP_files", for a full path name of "E:\LWP_files\".

However, another problem arises when the application program files are installed on a removable media, and it is desirous to be able to use those programs on a plurality of machines. For example, a re-writable CD-ROM (CD-RW) drive in a first machine may be assigned the drive letter "E:", so during installation, the program is set up to execute from drive "E:". Subsequently, the same disk is installed in a second machine for use of the software stored on it, but in the second machine the CD-RW drive assignment is different, say "F:". It is highly likely that the application program will not operate correctly because it will attempt to refer to a drive "E:" to retrieve executables, configuration files, and DLLs. Two possibilities exist. First, the second machine has a drive "E:" with similar files, for example a previous version of the same software. In this case, the software application may appear to run correctly with unexplainable problems. The second possibility is that there is no "E:" drive in the second machine or the existing "E:" drive does not have files by the names sought, so the application program will return many "File Not Found" errors throughout its execution, or may not execute at all.

In either of the two cases presented above, it would be burdensome to adjust the centralized database to assign temporarily the drive letter "E:" to the removable disk. In fact, even if it were easy to do this, other programs on the second machine which relied upon the "E:" drive may become unstable or inoperable when the removable drive is designated as "E:".

Several known methods have been developed to allow changing of drive letters. U.S. Pat. No. 5,634,029 to Chen discloses a hardware solution whereby the hardware selectors to assign drive letters to drive devices are interchanged using logic on the cabling interfaces, such as the IDE cables. This solution is limited to interchange of devices on the same bus, so the swapping of drive letters between two devices located on separate IDE or SCSI busses would not be supported by the apparatus as disclosed.

U.S. Pat. Nos. 5,121,483, 5,386,516, and 5,896,546, all to Monahan, et al, rely upon centralized databases for recording the drive letter assignments.

Therefore, there exists a need in the art for a method and apparatus to assign and record preferred drive letters to fixed and removable media in such a way that does not require extensive manual intervention or configuration. Further, there exists a need in the art for a "sticky" drive letter method which allows the media itself, such as a floppy disk or CD-ROM disk, instead of the drive unit or the drive cabling, to record the preferred drive letter assignment for that piece of media. Additionally, there exists a need in the art for the sticky drive letter method and apparatus to be backward compatible with existing personal computer drive formats.

SUMMARY OF THE INVENTION

The foregoing and other objects, features and advantages of the invention will be apparent from the following more particular description of a preferred embodiment of the invention, as illustrated in the accompanying drawings wherein like reference numbers represent like parts of the invention. The invention employs a database for the recording of the assigned drive letters, but distributes the database across multiple drives and media, rather than centralizing the database as prior art systems have done. Fragments of the database are stored within the unused portion of disk space located after an MBR or EBR. In these fragments, the drive letter assignments or logical volume assignments for the particular piece of media and partition are stored.

BRIEF DESCRIPTION OF THE DRAWINGS

The following detailed description when taken in conjunction with the figures presented herein provide a complete disclosure of the invention.

DETAILED DESCRIPTION

Figure 1:
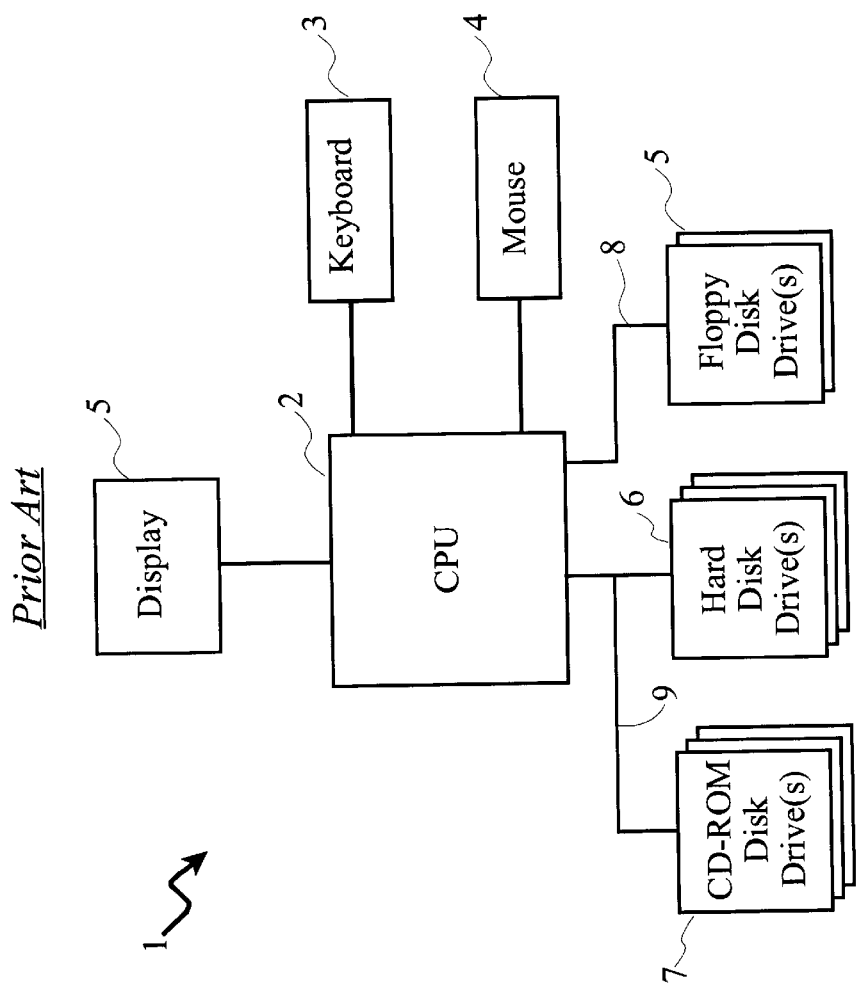
FIG. 1 discloses the fundamental hardware architecture of a computer such as a personal computer.
Figure 2:
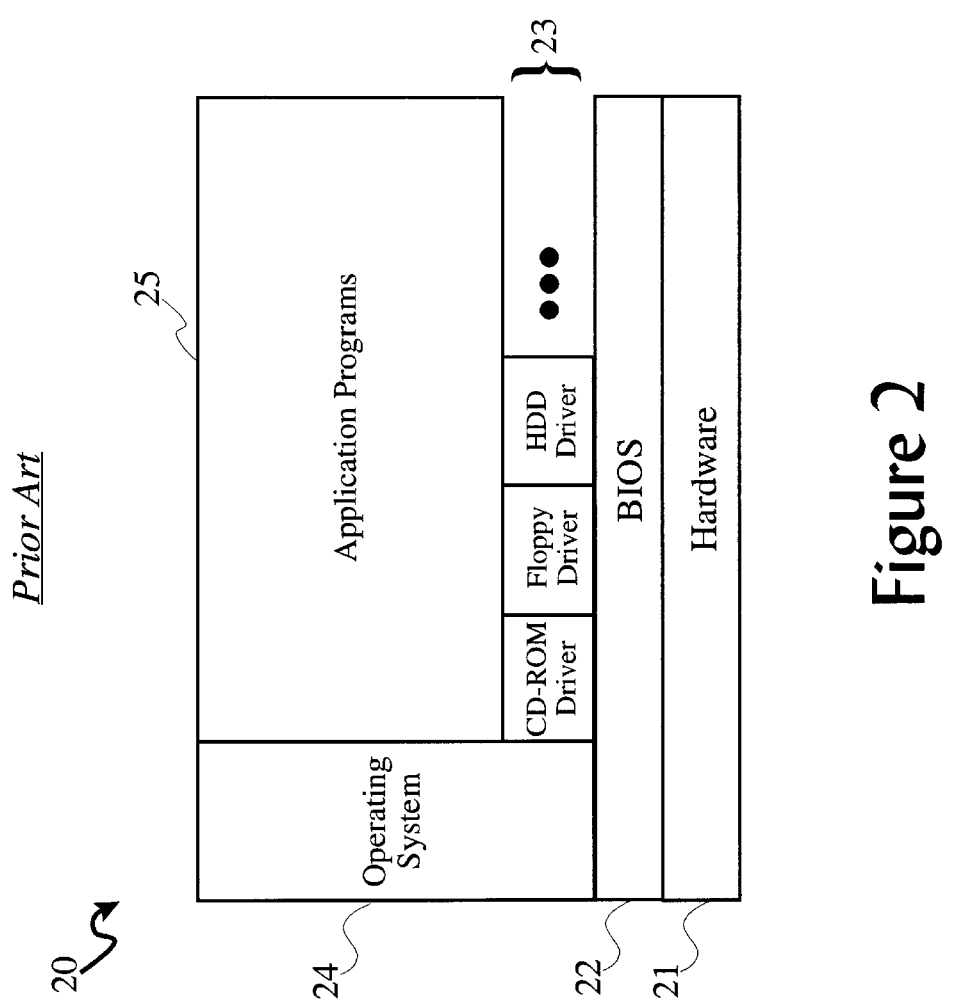
FIG. 2 discloses the fundamental software architecture of such a computer as shown in FIG. 1.
Figure 3:
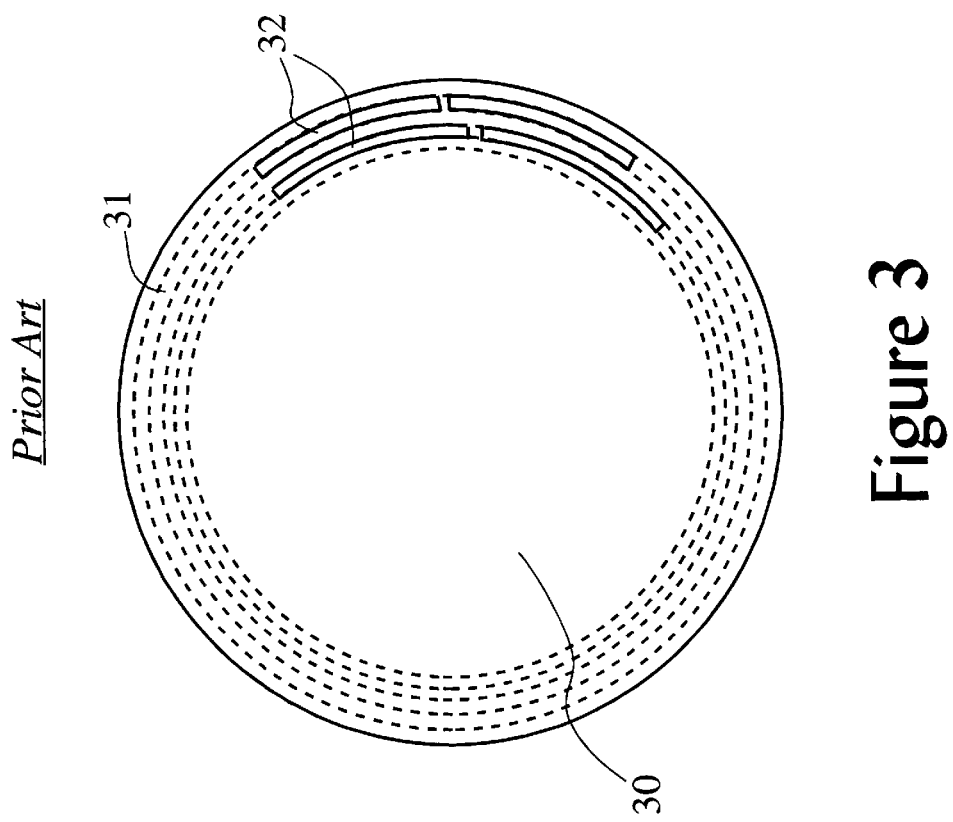
FIG. 3 illustrates the nature of formatting computer disk surfaces into tracks.
Figure 4:
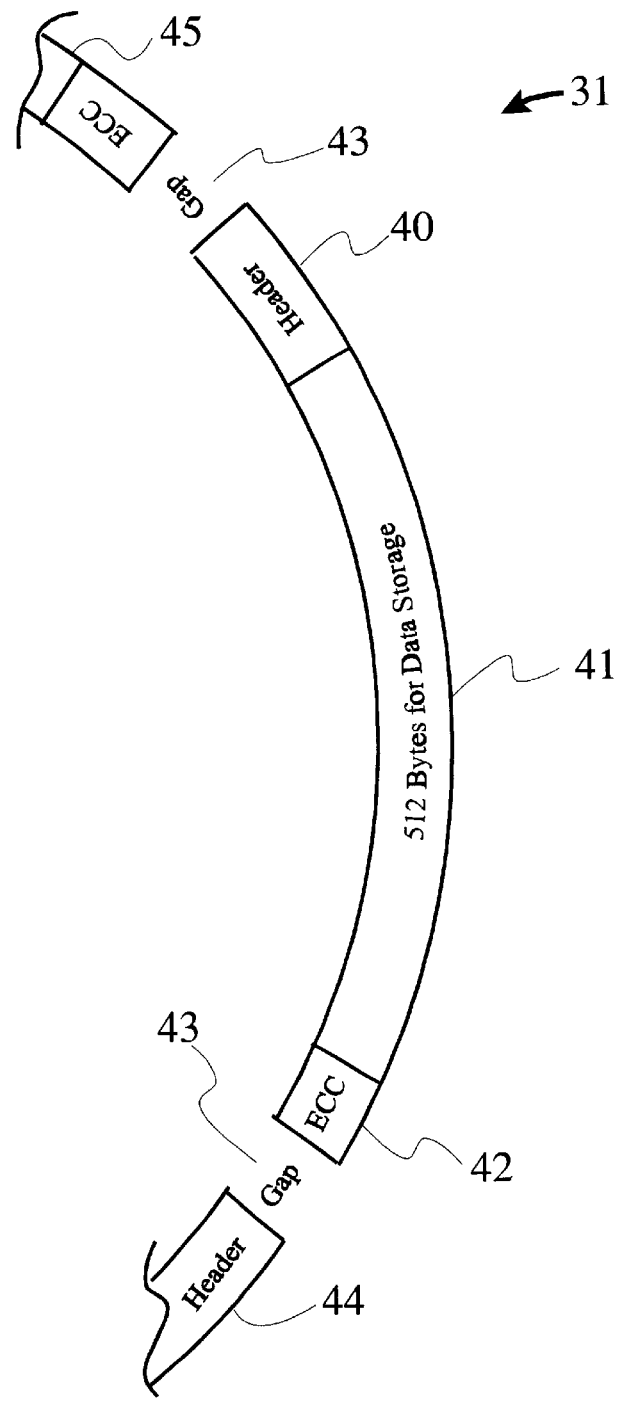
FIG. 4 sets forth a more detailed view of such a track as shown in FIG. 3.

The invention employs a distributed database for the recording of the assigned drive letters, having database fragments distributed across multiple drives and media within the unused portions of disk space located after MBR's and EBR's. In each fragment, a drive letter assignment or logical volume assignment for that particular piece of media is stored.

Because the space used to store the database fragment is inaccessible by typical application programs, this method is transparent to programs which view the disk as a traditionally formatted disk. A special database manager, or logical drive manager, can access the database fragments on all disks, and assign each disk and partition the preferred drive letter assignment. As disks are inserted and removed from the drive during runtime, the special database manager can appropriately update the drive letter assignments and resolve any conflicts that may arise.

The invention is preferably implemented using shadow partition tables. A traditional partition table is stored in each MBR or EBR on a disk, as described supra, and contains entries which describe partitions. Each entry which is in use will contain, among other things, the starting and ending points for the partition as well as the size of the partition.

For each traditional partition table on a disk there is a shadow partition table. Therefore, one shadow partition table exists for each MBR or EBR on a disk. The shadow partition table for an MBR or EBR is located in one of the unused sectors in the track (preferably the last sector of the track) containing that MBR or EBR. The shadow partition table for an MBR or EBR has the same number of entries as the traditional partition table in the MBR or EBR, but its entries will contain drive letter assignment information in addition to partition information.

Table 2 represents the basic information that needs to be stored in each entry in the shadow partition table. Each entry in the shadow partition table must contain a partition definition and the drive letter which is assigned to the partition being defined. There are multiple well-known ways to define partitions, but all known ways are essentially equivalent.

TABLE 2

Shadow Partition Table

| Partition* | Start LBA of Partition | Length in sectors | Drive Letter Assignment |
|---|---|---|---|
| first | 63 | 6297417 | c:\ |
| second | 6297480 | 6297480 | e:\ |

The table does not actually have to include an entry "first, second, etc." (Note *); this is included for reference only. The starting point of the partition and the size of the partition is used to define a partition. The first item in Table 2 is the Logical Block Address (LBA) of the first sector of the partition. This defines the starting point of the partition. The second item is the size of the partition. Taken together, these two values define a partition. The last item in a shadow partition table entry is the drive letter assigned to the partition defined in the entry. When an entry in a shadow partition table is not being used, all of its fields will be set to 0.

The basic method for managing shadow partition tables is to mirror the method by which traditional partition tables are managed. Thus, if an MBR or EBR is created, its corresponding shadow partition table is immediately created. If an MBR or EBR is deleted, then its corresponding shadow partition table is deleted as well. If an entry is created or deleted in a traditional partition table, a corresponding entry is created or deleted in the corresponding shadow partition table. Every partition in the system is defined by a single traditional partition table entry and a single shadow partition table entry.

At this point, it is important to understand how an entry in a traditional partition table is associated with an entry in the corresponding shadow partition table. Since there is no default or fixed ordering convention for the entries in a traditional partition table, and since the order of entries in a traditional partition table does not affect the partitioning of the disk, the position of an entry in the traditional partition table cannot be relied upon to associate an entry in the traditional partition table with an entry in the shadow partition table. Instead, traditional partition table entries and shadow partition table entries must be associated based upon the partitions they define.

Therefore, the process for managing the association between partition definitions in traditional partition tables and definitions in the shadow partition tables must directly compare the partition which is defined by the entries. For a given traditional partition table entry, the corresponding shadow partition table must be searched for an entry which defines the same partition including starting LBA and length. If such an entry is found, then that entry is the corresponding shadow partition table entry.

Figure 5:
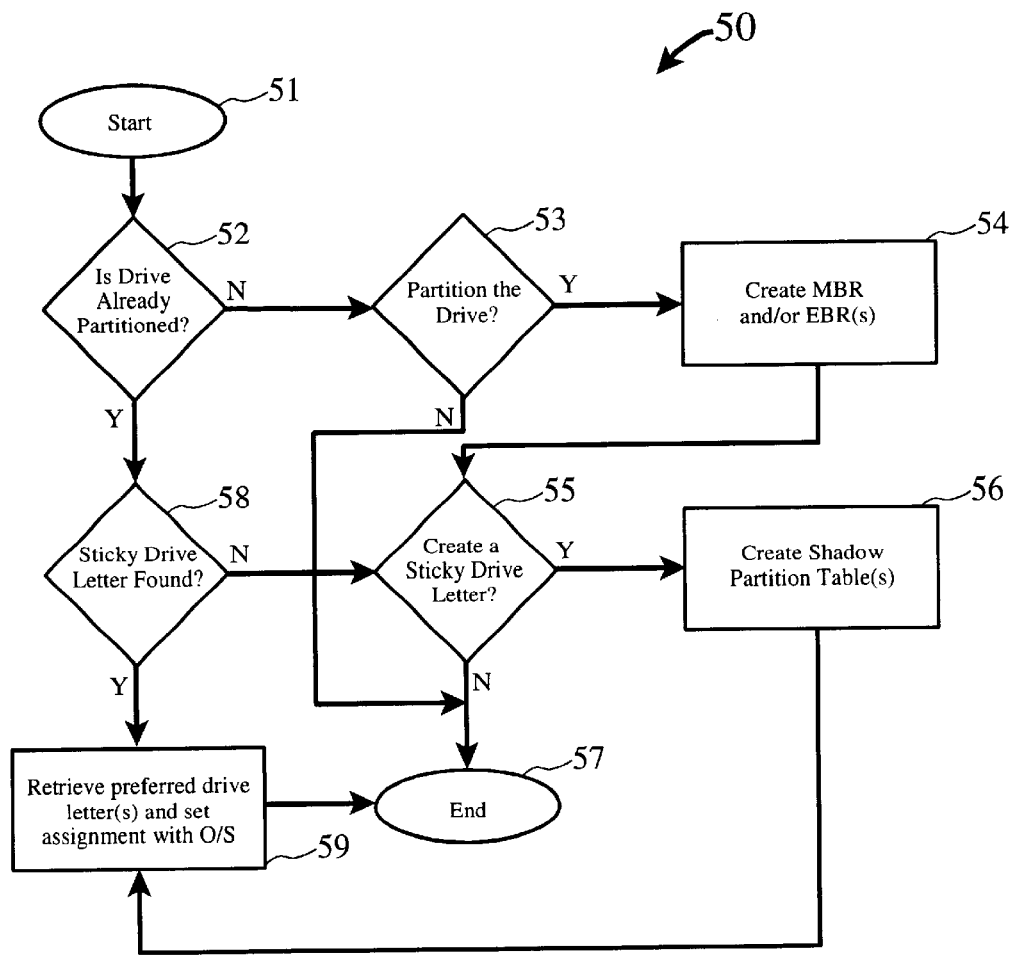
FIG. 5 discloses the logical process of the invention.

FIG. 5 illustrates the essential logic of the process to manage the sticky drive letter assignments. Starting (51) when a new drive is detected during the computer power-up sequence, or when a new removable media such as a CD-ROM is detected as having been installed, the drive is searched for an existing MBR and/or EBR(s) to determine if it is already formatted (52). If it is not already partitioned, the user or operator of the computer can be prompted for an option to partition the drive (53). If chosen, the partitions of the MBR and/or EBR(s) are created in the normal manner (54), thereby also creating the unused space following the MBR and EBR(s). The user or operator can then be prompted (55) to create or assign sticky drive letters to the partitions, and if chosen, one or more shadow partition tables are created and stored in the unused disk space (56) in the manner described already.

In summary, a partition table is contained in an MBR or EBR. The shadow partition table corresponding to an MBR or EBR is located in the unused sectors which follow the MBR or EBR. Given an entry in the partition table contained in an MBR or EBR, the corresponding entry in the corresponding shadow partition table is the entry which defines the same partition. For a given partition in the system, there is a single entry in a traditional partition table that defines that partition, and there will be a single corresponding entry in a shadow partition table that defines the same partition. The drive letter assigned to that partition is stored in the shadow partition table entry which defines it, thereby completing the association of the preferred drive letter assignment with a partition in a way which physically travels with the medium (such as a removable disk), in a manner consistent with backwards compatibility for prior art partition table management.

As shown in FIG. 5, if the drive is already partitioned (52), the process of searching for shadow partition table(s) and associating corresponding entries with the MBR and EBR(s) as described already is invoked (58). If no shadow partition tables are found, the user may be prompted to optionally created the sticky drive letters (55).

If sticky drive letters already exist (i.e. shadow partition tables already exist), the operating system is notified of the preferred drive letters for the partitions, and the process is ended (57).

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A computer-readable disk media comprising:
   a disk formatted into sectors, tracks, cylinders and partitions, said tracks being of uniform length of sectors, and said partitions starting on integral cylinder boundaries;
   at least one standard partition table located in a first sector, said partition table including definitions of at least one partition, said definition including a logical block starting address and a partition length; and
   at least one shadow partition table containing one record corresponding to each said partition definition of said standard partition table, each of said records including a preferred drive letter assignment for said corresponding partition definition.

2. The computer-readable disk media of claim 1 wherein said shadow partition table is stored following a standard partition table and preceding a partition starting point.

3. The computer-readable disk media of claim 2 wherein said standard partition table is a Master Boot Record.

4. The computer-readable disk media of claim 2 wherein said standard partition table is an Extended Boot Record.

5. The computer-readable disk media of claim 1 wherein said record in said shadow partition table further comprises a logical block address starting point and partition length associated with said preferred drive letter assignment for said corresponding partition definition.

6. A method of correlating entries in two partition tables stored on computer-readable disk media) said partition tables each containing records for partitions on the disk media, said records containing at least one starting logical block address and one partition length definition, said method comprising the steps of:
   searching a first partition table for at least one record which contains equal starting logical block address and partition length definitions as the starting logical block address and partition length definitions contained in a second partition table;
   associating pairs of records from said first and said second partition tables which contain equal starting logical block addresses and partition lengths; and
   associating a drive letter assignment definition contained in at least one of said partition tables associated with said partition.

7. The method of correlating entries in two partition tables of claim 6 wherein at least one of two said partition tables is a Master Boot Record.

8. The method of correlating entries in two partition tables of claim 6 wherein at least one of two said partition tables is an Extended Boot Record.

9. The method of correlating entries in two partition tables of claim 6 wherein at least one of two said partition tables is a Shadow Partition Table.

10. A system for formatting and applying a sticky drive letter to a computer disk media, comprising:
   a means for writing computer data onto at least one surface of said computer disk media;
   a controller means for controlling said disk writing means for formatting the surface of the computer disk media into sectors, tracks, cylinders and partitions according to industry norms for personal computer disks, wherein each partition begins on an integral cylinder boundary, and wherein each disk contains at least one standard partition table in the first sector of the disk, said standard partition table including standard records defining the start logical block address and length for each partition on a computer disk media; and
   a sticky drive letter management means suitable for creating at least one shadow partition table disposed in disk space following a standard partition table and preceding the beginning of a partition, such that said shadow partition table contains at least one shadow record which associates partitions on the disk with preferred drive assignments.

11. The system for formatting and applying a sticky drive letter to a computer disk media of claim 10 wherein said preferred drive assignments include drive letter assignments.

12. The system for formatting and applying a sticky drive letter to a computer disk media of claim 10 wherein said computer disk media include removable disk media.

13. The system for formatting and applying a sticky drive letter to a computer disk media of claim 10 further comprising a means for automatically associating standard records in said standard partition table with shadow records in said shadow partition table.

14. The system for formatting and applying a sticky drive letter to a computer disk media of claim 13 wherein said means for automatically associating standard records and shadow records further comprises means for determining said association by comparing starting logical block addresses and lengths in each record in the standard partition table and the shadow partition table.

15. A disk server system for providing access to at least one computer disk media having sticky drive letters recorded on each disk media, said computer disk media having a format including one or more partitions, said disk server system comprising:
    a first means for reading and interpreting at least one standard partition table disposed on said computer disk media;
    a second means for reading and interpreting at least one shadow partition table disposed on said computer disk media, said shadow partition table containing preferred drive reference assignments for each partition of said computer disk media; and
    an operating system means operably disposed within said disk server system for assigning drive references to disks and disk partitions according to said preferred drive references in said shadow partition table.

16. The disk server system of claim 15 wherein said second means for reading and interpreting said shadow partition table is further adapted to read shadow tables which are disposed in disk space following said standard partition table and prior to a beginning of a partition table.

* * * * *